United States Patent Office.

EUSTACE CAREY, HOLBROOK GASKELL, JR., AND FERDINAND HURTER, OF WIDNES, COUNTY OF LANCASTER, ENGLAND.

PURIFICATION OF ALKALINE SOLUTIONS.

SPECIFICATION forming part of Letters Patent No. 254,918, dated March 14, 1882.

Application filed December 15, 1881. (No specimens.) Patented in England March 17, 1881.

*To all whom it may concern:*

Be it known that we, EUSTACE CAREY, HOLBROOK GASKELL, the younger, and FERDINAND HURTER, subjects of the Queen of Great Britain and Ireland, and residing at Widnes, in the county of Lancaster, England, have invented certain Improvements in the Purification of Alkaline Solutions, (for which we have obtained a patent in Great Britain, No. 1,161, dated the 17th day of March, 1881,) of which the following is a specification.

Solutions of soda or potash frequently contain silica and alumina. When desired, these impurities are usually removed, or partially removed, by passing carbonic acid through the solutions, thereby precipitating silica and alumina. Silica and alumina so precipitated separate in combination; but if the silica is in excess of the quantity necessary for combination with the alumina present such excess is not precipitated.

Now our said invention relates to solutions containing an excess of silica, and in order to remove such excess we add to the solution, before or during the carbonating process, oxide or hydrate, or salt of aluminium, in quantity sufficient at the least, with the alumina already contained, to cause the precipitation of the whole of the silica, and we prefer to add an excess of alumina, as any such excess can be removed by carbonic acid.

In carrying out our said invention we prefer to operate in the following manner: We find it convenient to add the alumina in solution. Such a solution can be readily obtained by the use of the mineral known as "bauxite." When dealing with soda solutions we prepare a solution of alumina in caustic soda by treating pulverized bauxite with a hot or boiling solution of caustic soda of about 1.15 specific gravity, until the soda is saturated, or nearly saturated, with alumina. When dealing with potash solutions we prepare a solution of alumina in caustic potash in a similar manner. We then add to and ultimately mix with the alkaline solution to be purified such a quantity of this solution of alumina as to insure the complete precipitation of the silica. We ascertain when enough alumina has been added by placing a small sample of the solution in a test-tube, adding an excess of a saturated solution of bicarbonate of soda, boiling and filtering. If the addition of chloride of ammonium to the filtrate and boiling produces a precipitate, enough alumina has not been added. We continue to add alumina to the alkaline solution until a sample treated with chloride of ammonium, as above, shows no precipitate. When sufficient alumina has been added we pass carbonic-acid gas or a mixture of carbonic-acid gas and air through the solution, preferably keeping the solution boiling, or at a temperature approaching the boiling point, until the whole of the silica and alumina are precipitated. The silica and alumina so precipitated can be readily separated from the solution by settling or filtration in the usual manner.

This process may advantageously be used in combination with the processes for which certain former British Letters Patent were granted to us, dated July 18, 1870, No. 2,939, and February 11, 1880, No. 608.

When applying our present process, together with those processes for decomposing ferro-cyanides, we prepare the alkaline solutions, as hereinbefore described—that is to say, we first add the necessary quantity of alumina in order to insure complete precipitation of all the silica in the subsequent operation. We then proceed exactly as described in our said former specifications. The addition of the alumina has also the effect of diminishing incrustation in the high-pressure boiler described in the specification to our said former British Letters Patent No. 2,939, in the year of our Lord 1879.

Having now described and particularly ascertained the nature of our said invention and the manner in which the same is or may be used or carried into effect, we would observe, in conclusion, that what we consider to be novel and original, and therefore claim as the invention, is—

In the purification of alkaline solutions the addition of alumina to the solution, substantially in the manner and for the purpose hereinbefore described.

In testimony whereof we have signed our names to this specification in the presence of two subscribing witnesses.

EUSTACE CAREY.
HOLBROOK GASKELL, JR.
FERDINAND HURTER.

Witnesses:
E. H. PERRIN,
J. E. PERRIN,
    *Both of Exchange St., Liverpool.*